(12) United States Patent
Kütt et al.

(10) Patent No.: US 9,184,938 B2
(45) Date of Patent: Nov. 10, 2015

(54) COMMUNICATIONS SYSTEM

(75) Inventors: Andres Kütt, Tallinn (EE); Stephanie Robesky, London (GB); Magnus Hiie, Tallinn (EE)

(73) Assignee: Skype, Dublin (IE)

(*) Notice: Subject to any disclaimer, the term of this patent is extended or adjusted under 35 U.S.C. 154(b) by 2269 days.

(21) Appl. No.: 12/006,054

(22) Filed: Dec. 28, 2007

(65) Prior Publication Data
US 2008/0232565 A1    Sep. 25, 2008

(30) Foreign Application Priority Data

Feb. 27, 2007  (GB) .................................. 0703759.1
Mar. 6, 2007   (GB) .................................. 0704329.2

(51) Int. Cl.

| | |
|---|---|
| G06Q 40/00 | (2012.01) |
| H04L 12/58 | (2006.01) |
| G06Q 20/06 | (2012.01) |
| G06Q 20/12 | (2012.01) |
| H04L 12/24 | (2006.01) |
| H04L 29/08 | (2006.01) |

(52) U.S. Cl.
CPC ............ *H04L 12/581* (2013.01); *G06Q 20/065* (2013.01); *G06Q 20/12* (2013.01); *H04L 41/5054* (2013.01); *H04L 51/04* (2013.01); *H04L 67/14* (2013.01)

(58) Field of Classification Search
CPC .................................................. G06Q 2220/12
USPC ..................................................... 705/40, 69
See application file for complete search history.

(56) References Cited

U.S. PATENT DOCUMENTS

| | | | | |
|---|---|---|---|---|
| 5,303,285 A | * | 4/1994 | Kerihuel et al. | ............... 455/461 |
| 5,677,955 A | * | 10/1997 | Doggett et al. | ................. 705/76 |
| 5,915,093 A | * | 6/1999 | Berlin et al. | .................. 709/219 |
| 6,163,771 A | | 12/2000 | Walker et al. | |

(Continued)

FOREIGN PATENT DOCUMENTS

| | | |
|---|---|---|
| CN | 101622635 | 1/2010 |
| WO | WO 2005/009019 A2 | 1/2005 |
| WO | WO-2008104833 | 9/2008 |

OTHER PUBLICATIONS

Liebau, N., et al., "Charging in Peer-to-Peer Systems Based on a Token Accounting System," *Computer Science*, 4033:49-60 (2006).

(Continued)

*Primary Examiner* — Charles C Agwumezie
(74) *Attorney, Agent, or Firm* — Danielle Johnston-Holmes; Micky Minhas

(57) ABSTRACT

A method of providing services in a communication system. The method comprises: establishing a call instance from a caller terminal to a service provider terminal in the communication system; transmitting from the service provider terminal a service proposal in the form of an electronic document via the established call instance to the caller terminal; selectively accepting or rejecting the service proposal at the caller terminal; and in the case of acceptance of the service proposal, transmitting a request for money to a backend server in the communication system from the caller terminal; transmitting electronic cash tokens from the backend server to the caller terminal in response to the request to receive money; forwarding the electronic cash tokens from the caller terminal to the service provider terminal, whereafter the service provider provides services in accordance with the service proposal.

21 Claims, 21 Drawing Sheets

(56) References Cited

U.S. PATENT DOCUMENTS

| | | | | |
|---|---|---|---|---|
| 7,454,232 | B2* | 11/2008 | Abuhamdeh | 455/558 |
| 2003/0187785 | A1 | 10/2003 | Bernstein | |
| 2006/0206422 | A1* | 9/2006 | Mashinsky | 705/40 |
| 2007/0011104 | A1 | 1/2007 | Leger et al. | |

OTHER PUBLICATIONS

Wolfe, D., "PayPal, Skype Link a Play for Remittances," *American Banker* 172(37):1-9 (2007).

Zhang, Q., "Research on the Preventive Strategy of Credit Risk in On-line Auction Market," *Proceedings of the IEEE Asia-Pacific Conference on Services Computing*:658-662 (2006).

Notification of Transmittal of the International Search Report and the Written Opinion of the International Searching Authority, or the Declaration from International Application No. PCT/IB2007/004472, Date Mailed: Jan. 23, 2009.

Notification Concerning Transmittal of International Preliminary Report on Patentability from International Application No. PCT/IB2007/004472, Date Mailed: Sep. 11, 2009.

"Foreign Office Action", CN Application No. 200780051815.0, (Mar. 9, 2011), 9 pages.

"Foreign Office Action", CN Application No. 200780051815.0, (Mar. 28, 2012), 14 pages.

"Foreign Office Action", CN Application No. 200780051815.0, Apr. 29, 2015, 13 pages.

\* cited by examiner

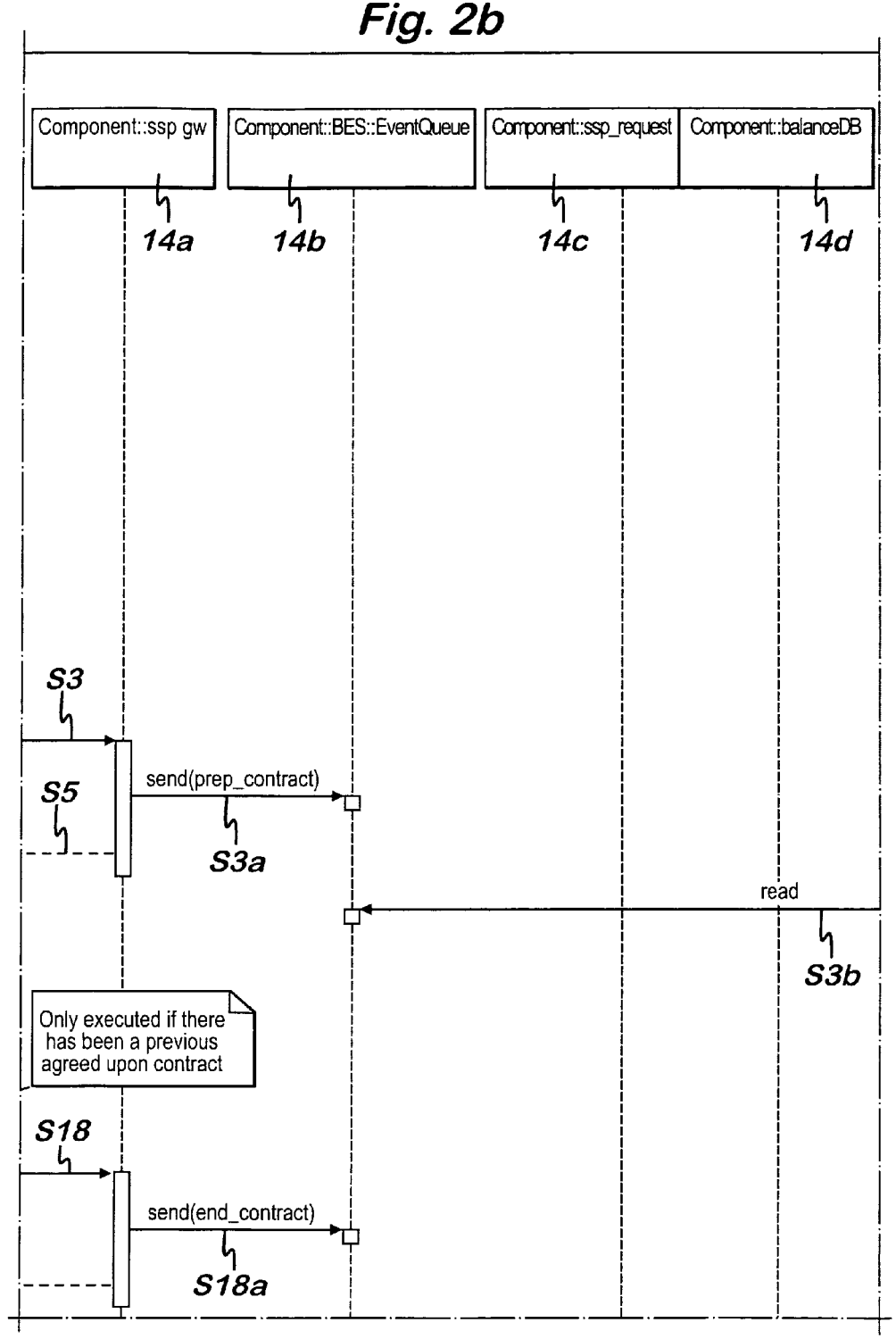

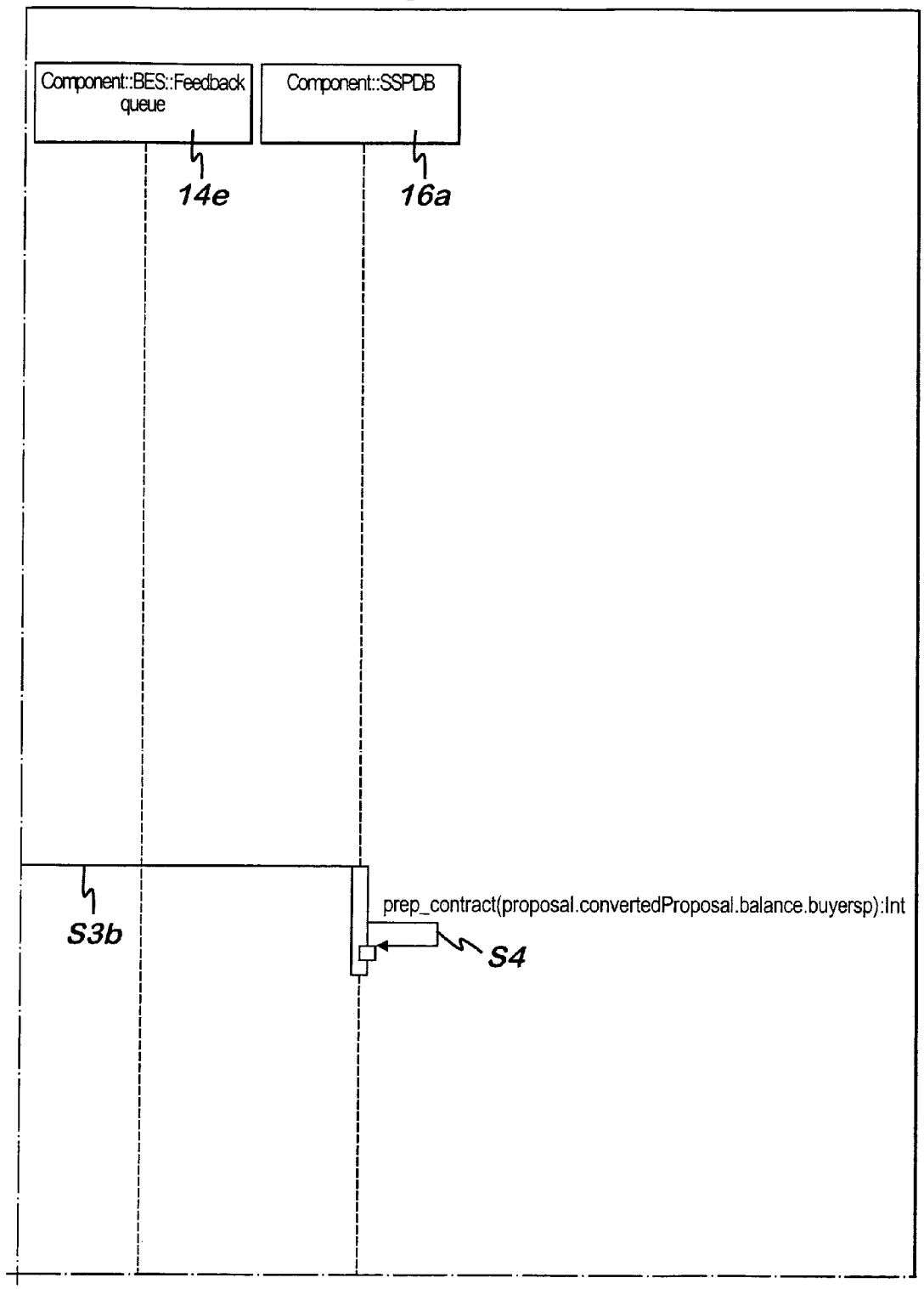

United States Patent (US 9,184,938 B2)

COMMUNICATIONS SYSTEM

RELATED APPLICATIONS

This application claims priority under 35 U.S.C. §119 or 365 to Great Britain Application No. 0703759.1, filed Feb. 27, 2007 and Great Britain Application No. 0704329.2 filed Mar. 6, 2007. The entire teachings of the above applications are incorporated herein by reference.

TECHNICAL FIELD

The present invention relates to service provision in a communication system.

BACKGROUND

A communication system exists where calls can be established via a public communication network such as the Internet using a peer-to-peer communication system. Currently, a system exists under the trade mark Skype which uses voiceover internet protocol (VoIP) packets to establish voice calls between users of the system. Calls are established by client software executed at client terminals in the system. The client software establishes a call instance between user terminals. A call instance can be used to convey voice, video, IMS or other types of data. Suitable internet packet protocols are used to convey the data.

Users of the system have in common the fact that they are all registered with a common provider of this system and this provides at least a first level of familiarity between users. That is, to the extent that the provider of the system monitors the behaviour of its users, there is a certain desirability of users of the system to want to deal with other users of the system as opposed to non users, where they need to access a service.

SUMMARY

In providing a service in such a communication system, authorisation and security issues need to be addressed.

The present invention provides a service provision system which makes use of this communications network in a way which allows service providers to ensure that they are paid for any service they provide to callers in a way that does not require service providers to directly demand cash from the callers themselves (with all of the problems that that could entail). In addition, security and authentication issues can be readily addressed.

One aspect of the invention provides a service provider terminal for providing a service the service provider terminal comprising: means for transmitting as an electronic document a service proposal via a call instance established between the service provider terminal and a caller terminal; and means for verifying the receipt of electronic cash tokens received from the caller terminal, said cash tokens indicating that a caller account has been debited for the service identified in the service proposal.

The electronic document can carry an authentication code or security key which can be used to authenticate the service provider. In the described embodiment the electronic cash tokens are signed in a cryptographic sense (that is they carry and authentication code), and can identify the service proposal, the caller and the service provider.

Another aspect of the invention provides a caller terminal arranged to receive services from a service provider terminal, the caller terminal comprising: means for establishing a call instance between the caller terminal and the service provider terminal; means for receiving a service proposal via the call instance and for forwarding the service proposal to a backend terminal; means for receiving electronic cash tokens from the backend terminal; means for forwarding the electronic cash tokens to the service provider terminal via the established call instance; and display means for displaying to a user of the caller terminal the service proposal, said display means enabling the user to accept or reject the service proposal.

The call instance can be any appropriate communication channel, e.g. wire call, private chat or public chat (where as is well known, a chat is typed messages that are exchanged over the network).

A further aspect of the invention provides a backend server comprising: means for receiving a service proposal relating to services to be provided from a service provider to a caller in a communication system in which the backend server is located; means for verifying the service proposal and for returning a verification message to a caller client; means responsive to a request for money from the caller client to determine the credit status of the caller and to return electronic cash tokens to indicate that a caller account has been debited to meet the demands of the service proposal. In the described embodiment, the value represented by the cash tokens relates to the service provided—one proposal can require several cash tokens.

The backend server can access a caller database which holds credit data for callers, the credit data relating to available funds of each caller.

Another aspect of the invention provides a method of providing services in a communication system, the method comprising: establishing a call instance from a caller terminal to a service provider terminal in the communication system; transmitting from the service provider terminal a service proposal in the form of an electronic document via the established call instance to the caller terminal; selectively accepting or rejecting the service proposal at the caller terminal; and in the case of acceptance of the service proposal, transmitting a request for electronic money to a backend server in the communication system from the caller terminal; transmitting electronic cash tokens from the backend server to the caller terminal in response to the request to receive electronic money; forwarding the electronic cash tokens from the caller terminal to the service provider terminal, whereafter the service provider provides services in accordance with the service proposal.

The invention also comprises a communication system including a caller terminal, a service provider terminal and a backend terminal as herein above described. The system also provides means to integrate with a payment mechanism for paying the service provider.

One aspect of this invention is provisioning payments using call instances, for example VoIP channels. A "micropayment" mechanism is implemented to guarantee payments from prepaid caller accounts. Payments are related to services which are provided. In the described embodiment of this invention, services are provided via the call instance, but it will be appreciated that the caller can pay the service provider to provide any appropriate services, not necessarily those which are provided over a call instance.

According to another aspect of the invention therefore there is provided a component configured to generate electronic cash tokens in the form of packets transmissible via a call instance, each token comprising a caller identifier, a service provider identifier, a proposal identifier, a monetary value and a cryptographic signature.

A further aspect provides a method of transmitting an indication that a caller account has been debited in a monetary value, the method comprising: generating electronic cash tokens in the form of packets transmissible via a call instance, each token comprising a caller identifier, a service provider identifier, a proposal identifier, a monetary value and a cryptographic signature; and transmitting electronic cash tokens indicating the predetermined value via a call instance established between two terminals in a communication network.

A further aspect provides a method of ensuring payment to a service provider who provides a service to a buyer in accordance with a service proposal, the method comprising: generating electronic cash tokens denoting a value sufficient to meet the demands of the service proposal; debiting a buyer account with that monetary value; and accruing the value debited from the buyer account to the service provider, wherein the method is carried out at a third party terminal independent of both a terminal of the service provider and a terminal of the buyer.

Authentication is important in the premium calls system due to fundamentally conflicting interests of caller and service provider. It allows the backend to communicate only with the buyer thereby reducing connections to the backend server. The buyer is an intermediary between the service provider and the backend. Both the service provider and the backend therefore need to trust in the information coming from the buyer, to ensure that it is genuine and has not been tampered with.

The proposal is sent from the service provider to the buyer, and this is passed from the buyer to the backend. The proposal is preferably signed using the identity of the service provider, to allow the backend to authenticate the offer.

Similarly, when cash tokens are sent from the backend to the buyer, and from the buyer to the service provider the tokens are preferably also authenticated (to ensure the buyer is not sending fake or replicated money). A crypto handshake can be setup between the service provider and the backend (via the buyer) using a shared context. In addition, the tokens themselves can be authenticated by the service provider using message authentication codes.

BRIEF DESCRIPTION OF THE DRAWINGS

For a better understanding of the present invention and to show how the same may be carried into effect, reference will now be made by way of example to the accompanying drawings, in which.

DETAILED DESCRIPTION

Figure 1:
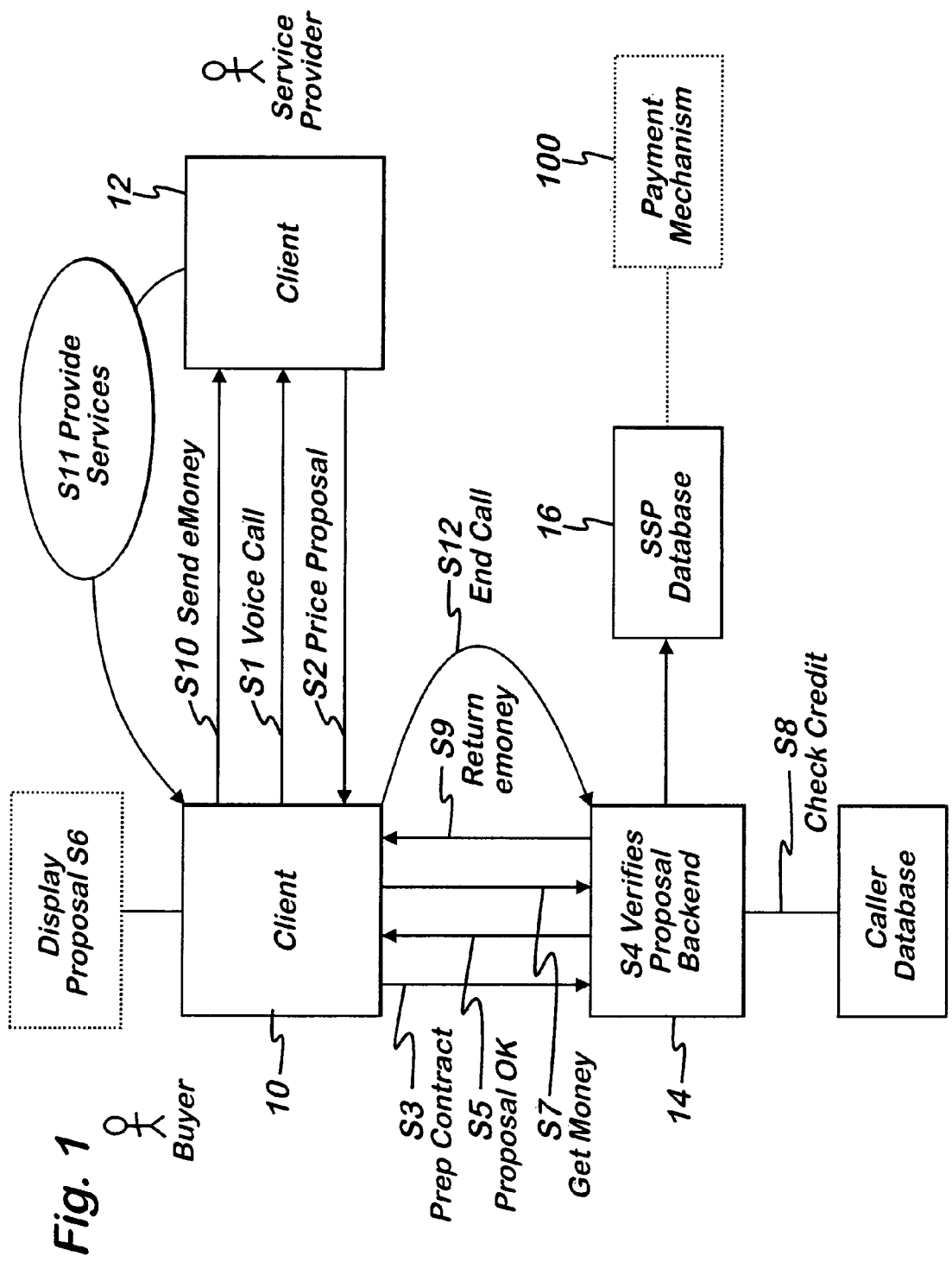
FIG. 1 is a schematic block diagram illustrating a service provision process.
Figure 2:
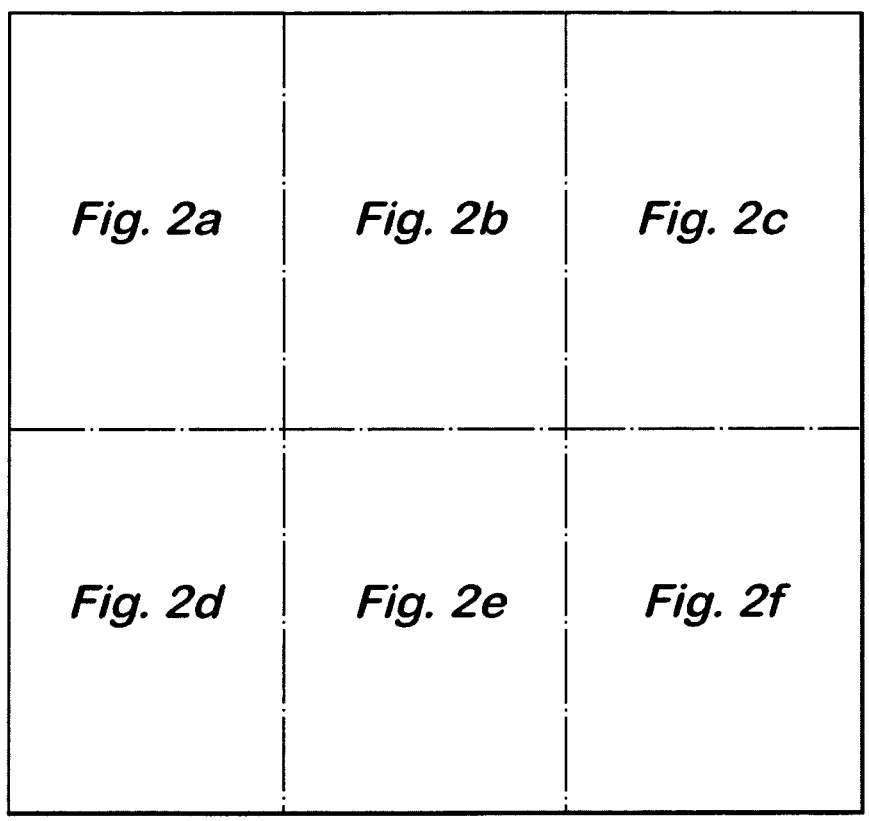
FIG. 2 is a schematic diagram illustrating message exchange in the service provision process.
Figure 2A:
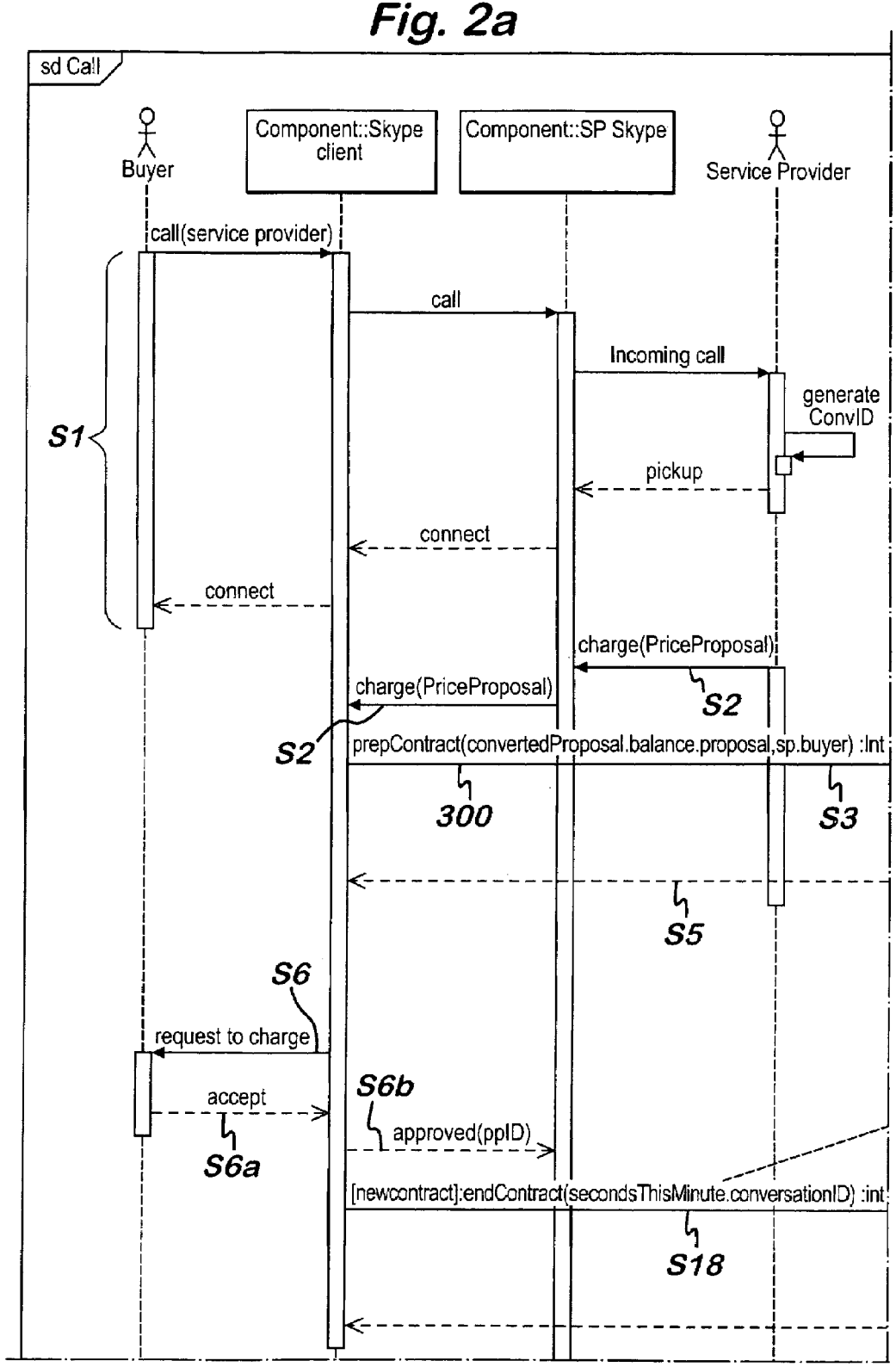
Figure 2D:
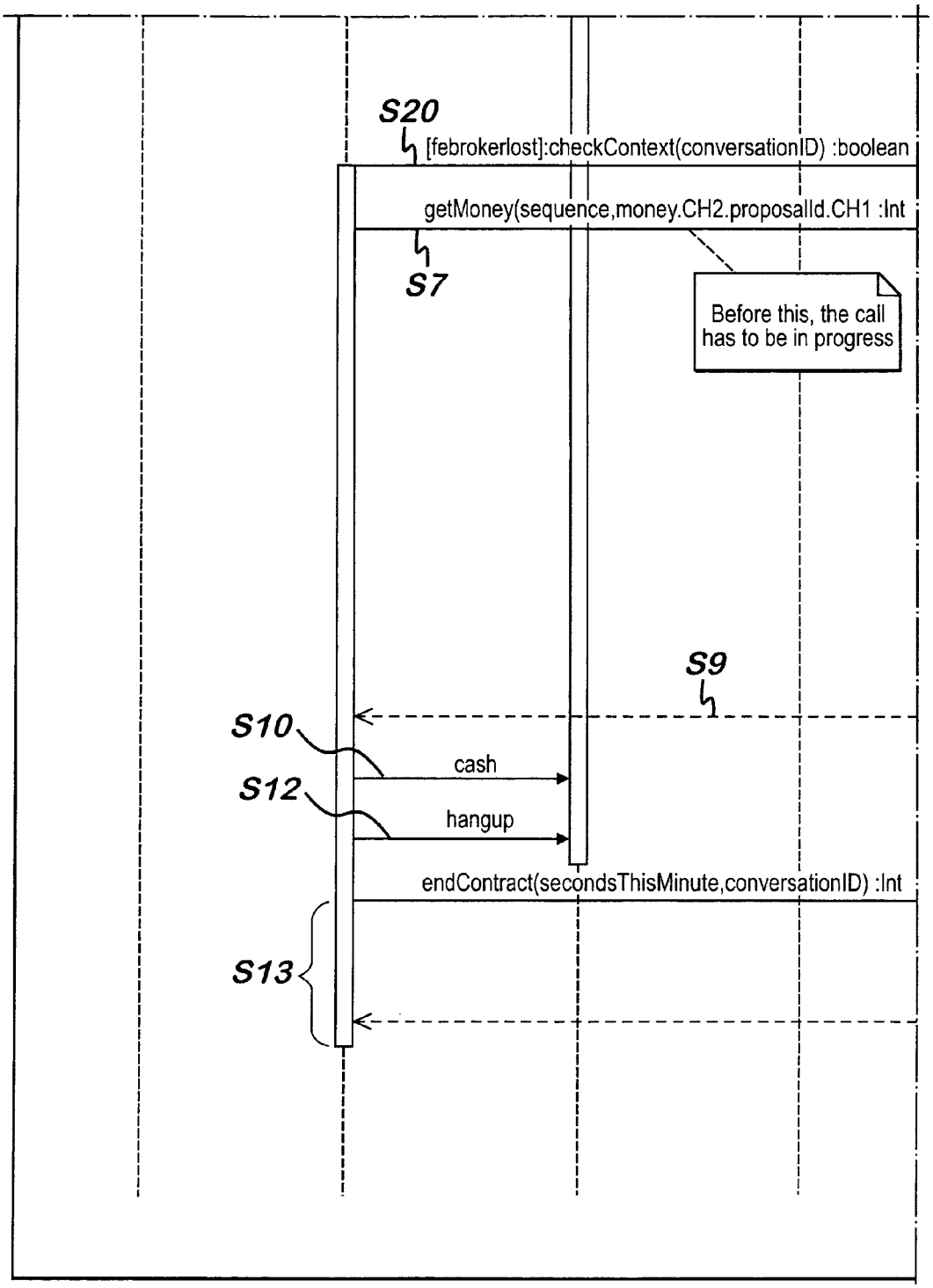
Figure 2E:
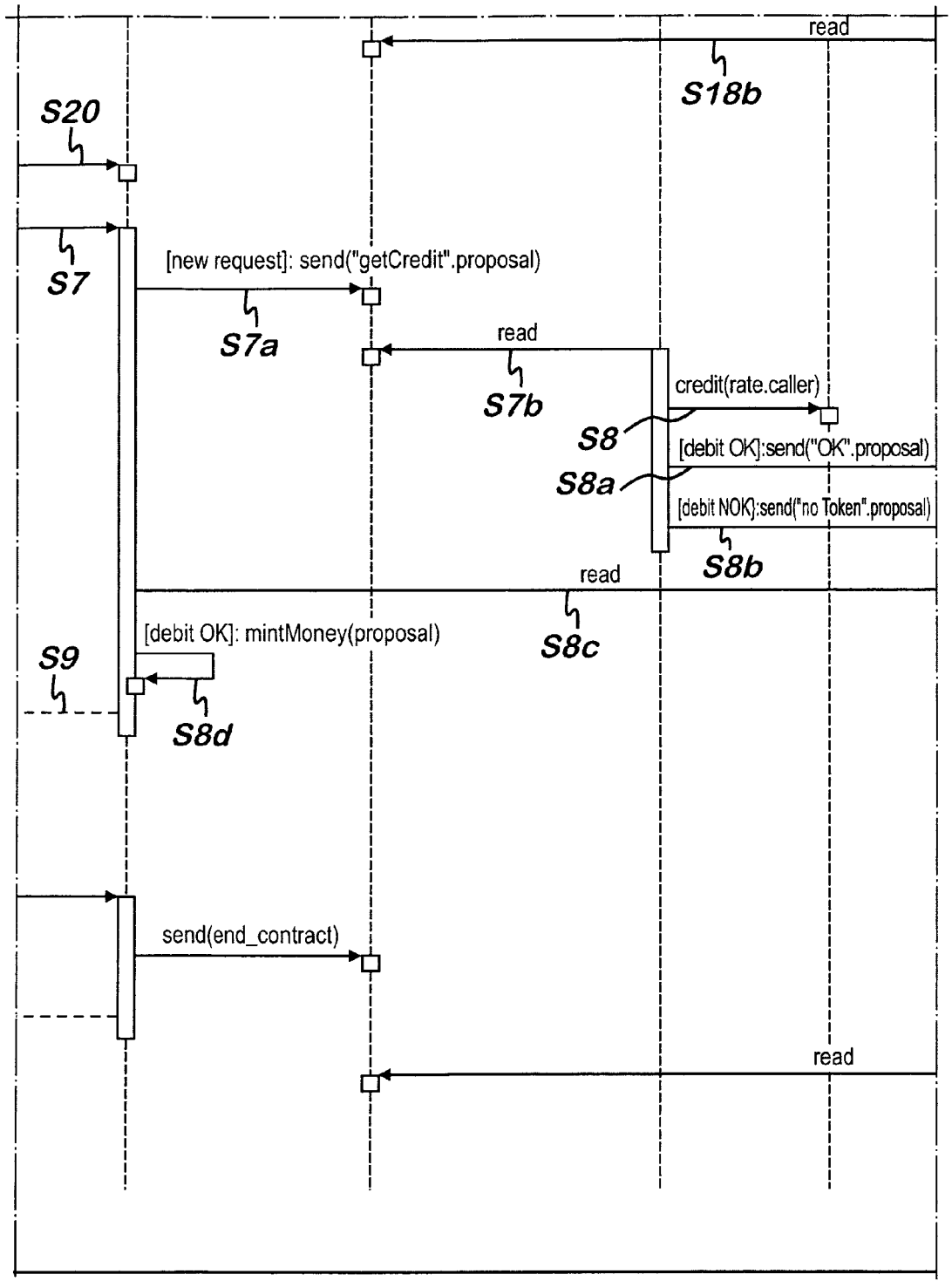
Figure 2F:
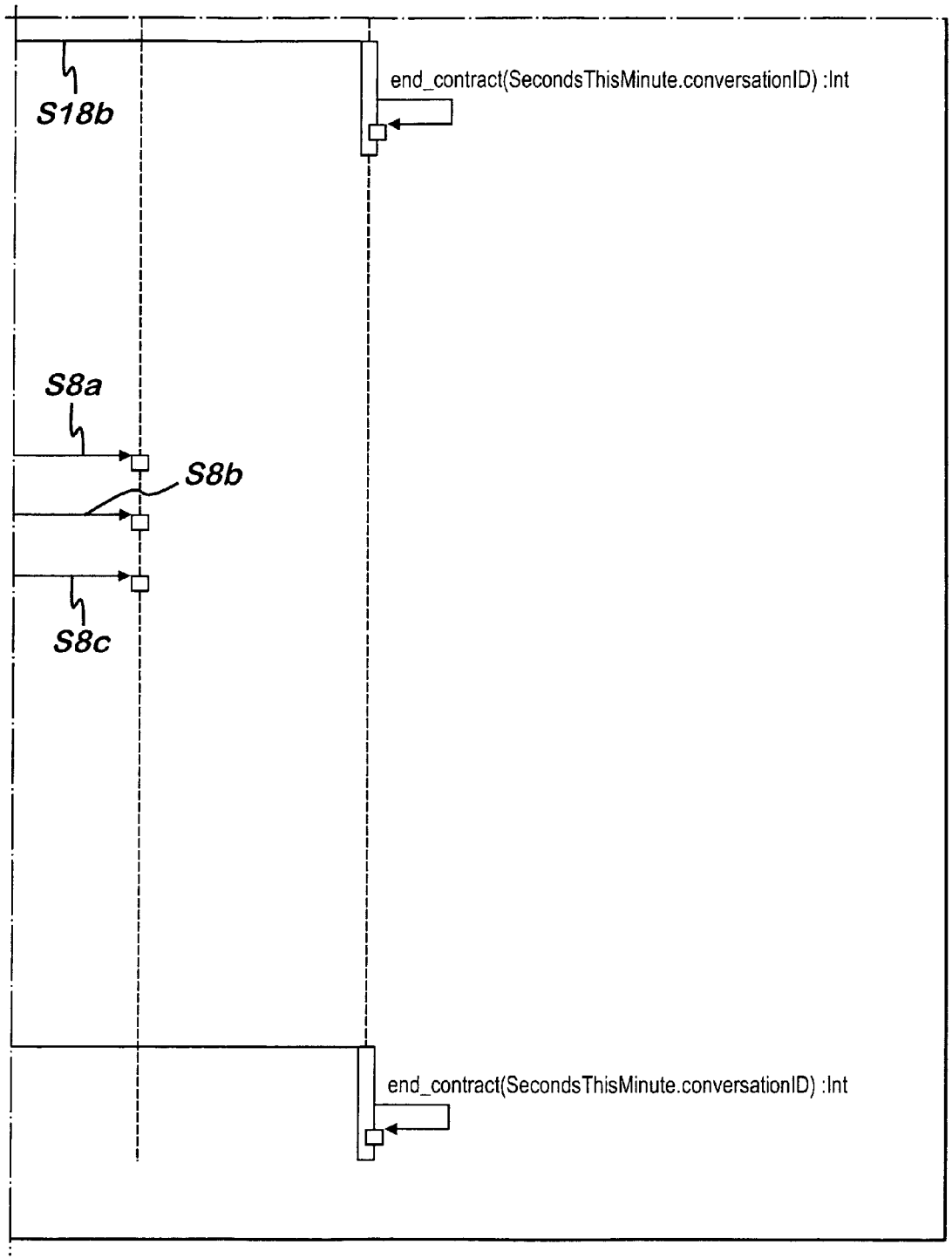

Reference will first be made to FIGS. 1 and 2 to describe a process in accordance with one embodiment of the invention.

FIG. 1 is a schematic block diagram illustrating in schematic form the components of a communication system which are involved in the process.

FIG. 2 is a message exchange chart which shows the components broken down in more detail and the message exchange flow.

In FIGS. 1 and 2, similar reference numbers denote similar steps in the process. Moreover, where a step in the process is related to another step, it is shown by that step number, annotated by a lower case letter.

According to step S1, a call is set up from a buyer at a buyer client terminal 10 and a service provider at a service provider client terminal 12. The client terminals form part of a communication network such as the Internet. In a preferred embodiment of the invention, this call is set up in a peer-to-peer communication system. A peer-to-peer (P2P) communication system allows a call instance to be established across a computer network such as the internet. In a currently available system, VoIP (voice over internet protocol) packets are used to transmit call data between client terminals establishing the call instance. To use a peer-to-peer service, client software is installed and executed at the terminals. The client software provides a VoIP connection as well as other functions such as registration and authentication. In particular, for the purposes of authentication, a user of the system registers himself with a backend server which provides an authorisation certificate to that user. When a call instance is established, the terminal receiving the call recognises the authentication certificate and so allows the call be established by the peer-to-peer network. The details of this system are not given further herein because they are known, for example from WO 2005/009019. It will be appreciated that terminals can take any form. For example, they can be personal computers (PCs) executing the client software or mobile communication devices such as phones, palmtops etc.

In the voice call, the buyer at the client terminal 10 can discuss with the service provider at the client terminal 12 details of a service which a service provider can provide to the buyer. If they agree the principles of a service to be purchased by the buyer, in accordance with step S2 a price proposal is despatched from the client terminal 12 to the client terminal 10. The service proposal (referred to herein as a price proposal) is in the form of an electronic document which carries an authentication code attached by the service provider. The electronic document is sent as packets using any suitable packet protocol.

At step S3 a prepContract message is prepared by the client's terminal 10 and despatched to a backend server 14. The prepContract message includes the price proposal as a secure electronic document. As shown more clearly in FIG. 2, a contract preparation message 300 (convertedproposal, balance, proposal, SP, buyer), and implements details of the price proposal. The message is forwarded to a ssp (Skype-to-Skype premium) gateway 14a of the backend server 14 over the communications network using a proprietary protocol such as the Skype protocol. This is shown in step S3. The ssp gateway 14a forwards (S3a) the prepContract message to a backend server event queue component 14b. A ssp database 16a reads (S4b) the message from the queue component 14b and verifies the service provider, checks for fraud and performs any necessary currency conversion in relation to the contract. This is illustrated at step S4. Once satisfied, the ssp gateway 14a transmits a proposal OK notification to the client terminal (S5) with the contract As shown more clearly in FIG. 2, according to step S6 the price proposal is displayed to the buyer at the client terminal 10. Acceptance of the buyer (as shown in step S6a) is returned to the client running on the client terminal 10 and an approval message shown as step S6b is returned to the service provider client 12.

When the buyer client terminal 10 receives a notification from the backend server 14 that the proposal is OK, a get money request is sent from the client terminal 10 to the backend server 14 (step S7). The get money request is shown in FIG. 2 in the following format:

Get money (sequence number, money, proposal ID).

That is, it defines a sequence number for security reasons (discussed later), an identifier of the proposal and the money value needed.

The get money request is received at the ssp gateway 14a which forwards a request to the backend server event queue (S7a) in a form of a new request for credit. A ssp request handler component 14c located in the backend server reads a credit request from the backend server event queue 14b and checks the credit of the buyer (step S8) with a user balance database component 14d at the backend server.

If the ssp request handler component 14c ascertains that the credit is good it despatches a message (debit OK) indicating that the buyer's account has been debited (S8a). If it establishes that the credit is not sufficient to meet the demands of the service proposal, it despatches a message to the effect that the client could not be debited (debit NOK)—step S8b. The debit OK and debit NOK messages are received by a feedback queue component 14e in the backend server.

The ssp gateway 14a reads the message from the feedback queue component 14e (S8c).

If the message received from the backend server feedback queue 14e is a debit OK message (S8d), then money is returned to the buyer client terminal 10 (step S9) in a form of cryptographically signed cash tokens prepared by the ssp gateway component 14a.

The term "cash tokens" is used herein to denote tokens which allow an indication to be transmitted that a buyer's account has been debited in a certain value. They are not cash or money in any real sense. They can be considered more as payment confirmations, in that they effectively guarantee that a payment will be made to the service provider in accordance with the value which has been confirmed to the service provider as having been debited from a buyer's account.

The cash tokens sent from the buyer terminal 10 to the service provider 12 (S10) indicate that the buyer's account has been debited to meet the demands of the price proposal with a view to providing payment to the service provider. Information about the money accrued to service providers is held in the ssp database 16a.

When the service provider sees that the cash tokens have been transmitted from the buyer he can then proceed to provide the services which have been agreed upon in the proposed contract based on the price proposal at step S2. The services are provided over the channel set up for the voice call. The services can be provided orally or can take the form of the transmission of digital information, such as still images, video etc. In fact, anything can be provided between the clients' terminals in accordance with the facilities which the communication system provides. The provision of services is denoted diagrammatically at step S11 in FIG. 1. When the service provider has ceased to provide the service, the call is ended (step S12), and an end call notification (endContract) is sent to the backend server 14 (S13). This is important, because it may be the case that services are being charged for on a timed basis, and the end call notification indicates the time over which the services are being provided.

The ssp database 16 is in communication with a payment mechanism 100 from which the service provider can receive payment (real money). This payment mechanism can advantageously take the form of the internet Paypal system if both the buyer and the service provider are signed up to that system. Other payment mechanisms are possible. What is important is that the provider of the communication system pays the service provider based on the money accrued to the service provider at the ssp database 17a. This can be based on call data records which store information on call detail.

Figure 3:
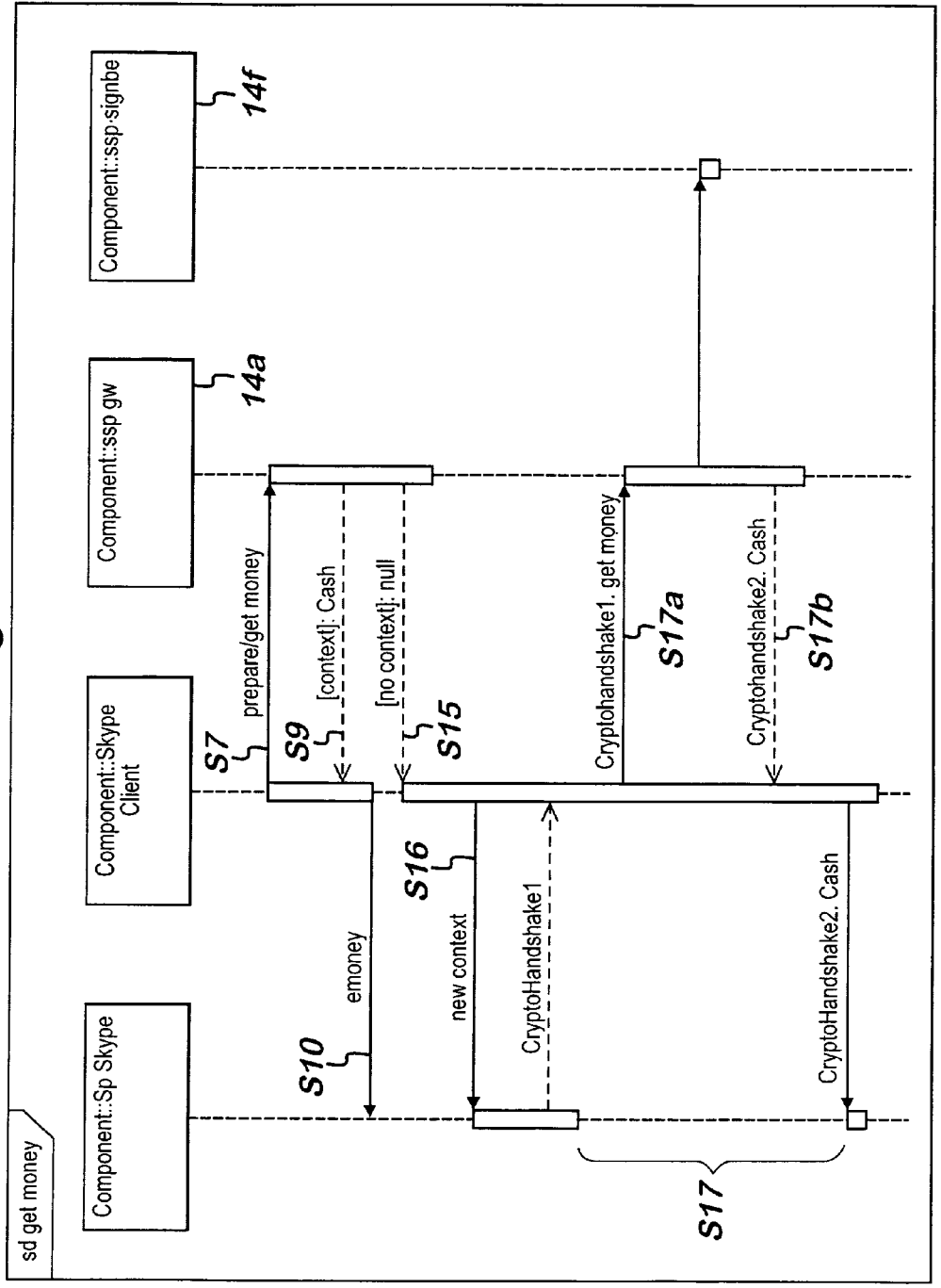
FIG. 3 is a schematic diagram of message exchange for transferring electronic cash in a service provision system.

Reference is now made to FIG. 3 to consider the transfer of cash tokens in more detail. FIG. 3 shows the step S7 of transmitting the get money request from the buyer client terminal 10 to the ssp gateway 14a of the backend server. If the ssp gateway recognises a proper context for the get money request, it returns the cash tokens at step S9. The cash tokens are then transmitted from the buyer client terminal 10 to the service provider client terminal 12 (step S10).

A crypto-context is used for securing cash tokens sent from the ssp gateway 14a to the client terminal 10 and from there to the service provider client terminal 12. The crypto-context is not used for securing messages from the service provider to the ssp gateway. The crypto-context is conversation based (call-based). A service provider has only one concurrent context per conversation (call). This means that a new crypto-handshake invalidates all cash tokens that the buyer has requested from the ssp gateway but has not yet passed to the service provider. As shown in FIG. 3, a handshake for a new context is initiated whenever the ssp gateway feels that it does not have the necessary context to return cash tokens (step S9). As shown in FIG. 3, if no context is detected, a null message is returned to the buyer client terminal 10 (step S15). A new context is requested between the client terminal 10 and the client terminal 12 at step S16. There follows a new crypto-handshake procedure denoted generally at step S17 which results in a new crypto-handshake denoted crypto-handshake 2 for returning cryptographically signed cash tokens (S17b) which were requested by get money request using crypto-handshake 1 (step S17a). The crypto-handshake 2 is RSA-signed with a special RSA key by a ssp-sign be component 14f located at the backend server.

Reverting to FIG. 2, an option which has not been discussed already is shown in FIG. 2 for a buyer to generate a new contract directly based on the previously agreed contract, and to send this to the ssp gateway component 14a of the backend server. This is shown at step S18 in FIG. 2. It also acts as an end contract message for the previous contracts. The ssp gateway forwards the message in a step denoted step S18a.

FIG. 2 also shows a message (S20) which is transmitted in the case that a febroker has been lost between requests. This could be important to maintain a solid crypto context between client and server.

In the above described example, the call instance is for a voice call. It will readily be appreciated that the call instance could be any appropriate communication channel which is available for example over the current peer-to-peer communication network implemented by Skype(™). Thus, service proposals could be transmitted via a chat or public chat where there is no voice, but where typed messages are exchanged via data packets over the network. The principles of this invention remain the same in those other contexts.

Figure 4:
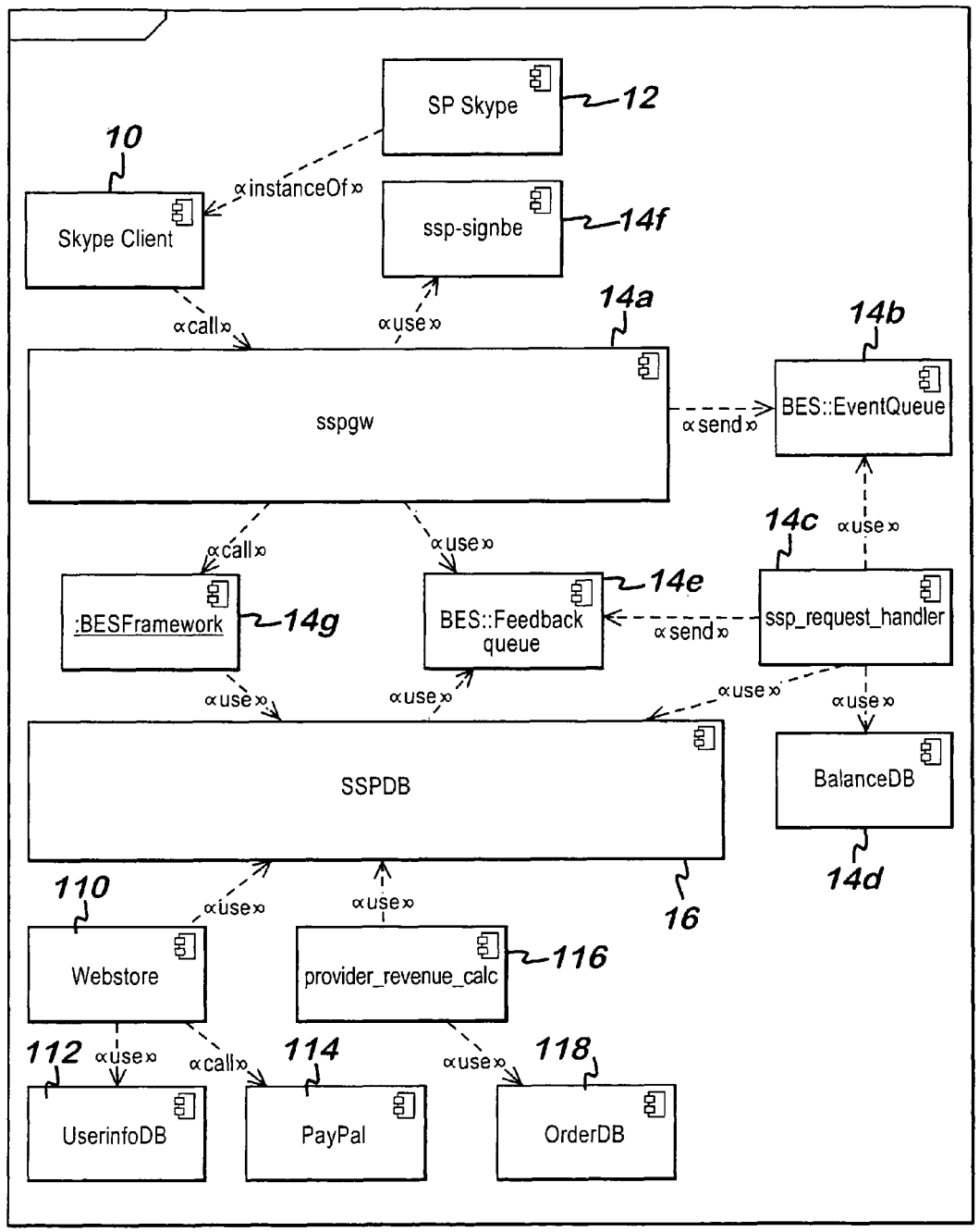
FIG. 4 is a schematic block diagram of the architecture of a service provision system.

FIG. 4 is a schematic diagram illustrating the components for implementing the process discussed above. Some of these components have already been illustrated and discussed in connection with FIGS. 1 to 3.

The buyer terminal client 10 is shown in communication with the service provider client 12 by a call channel or call instance. As discussed above, this can be implemented by using the peer-to-peer call mechanism.

In FIG. 4, the arrows between components which are labelled call denote a call functionality between components. The arrows which are labelled "use" denote that the component to which the arrow is headed supplies data to the component at the tail end of the arrow. The arrows labelled "send" transmit information in the direction of the arrow head from the sending component to the receiving component.

The ssp gateway component 14a uses signatures from the ssp signbe component 14f based on RSA keys held at the signbe component 14f for authentication purposes for the electronic documents and requests that the ssp gateway receives and transmits. The ssp gateway component 14a transmits requests to the event queue 14b as already discussed. The ssp request handler 14c takes the request and messages from the BES event queue 14b and uses data from the balance database 14d and the ssp database to fulfil the requests and supply responses to the BES feedback queue component 14e. A backend server framework component 14g is shown to handle calls which are established between the ssp gateway and the ssp database, and to talk to queue components—note that not all connections are shown for ease of clarity.

FIG. 4 also shows components associated with the payment mechanism 100 in the implementation where that is a Paypal mechanism. Paypal is a trade name of a widely used web-based payment system. A web store 110 can receive information from the ssp database 16 and from a user information database 112 for sign up with the Paypal server 114. FIG. 4 also illustrates a provider revenue calculator component 116 which calculates revenue for the service providers and an order database 118 whose function is not important.

As discussed above, the cash tokens must be signed by the ssp gateway for authentication and integrity. For this purpose an RSA key is stored at the ssp-signbe component 14f and used to obtain a signature. The service provider client terminal verifies the signature by a shared key mechanism which is agreed with one-way authenticated Diffie-Hellman key exchange. The security context is shared between the service provider terminal 12 and the backend server 14. The security context is setup after the service provider registers as a service provider with the backend server, and is updated as discussed in FIG. 3.

To prevent replay (or re-use) of cash tokens, the cash tokens include a service provider identifier and a buyer identifier, which the service provider client terminal checks. This avoids replay to a new service provider. In addition, to avoid replay to the same service provider within the same call, the cash token includes a price proposal identifier and a token sequence number. The service provider checks that the token sequence number does not repeat within the price proposal under which services are being provided. To avoid replay to the same service provider within a future call, price proposals for the same service provider are unique within the predetermined time period, for example a week. A check is done at the server side by the ssp gateway and measured from the contract preparation to end contract message. All issued cash tokens are set to expire within a period shorter than the predetermined time period. One method for achieving expiration is to periodically force a new crypto handshake (as shown in FIG. 3) from the ssp gateway in order to invalidate all old tokens.

Figure 5:
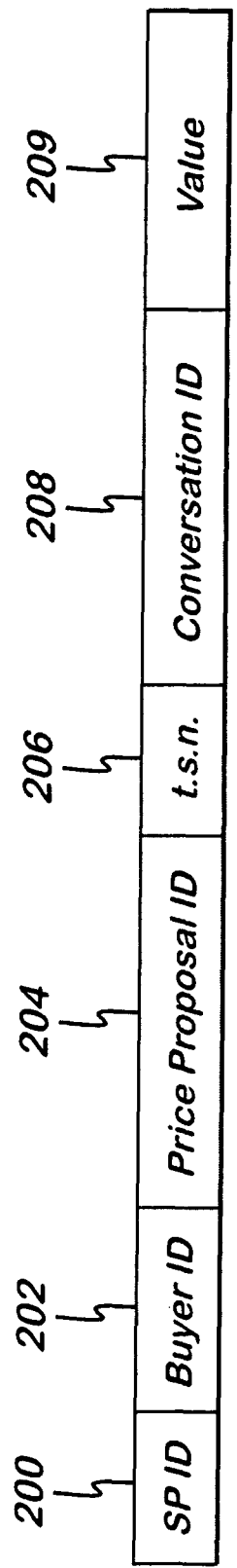
FIG. 5 is a schematic diagram of an electronic cash token.
Figure 6:
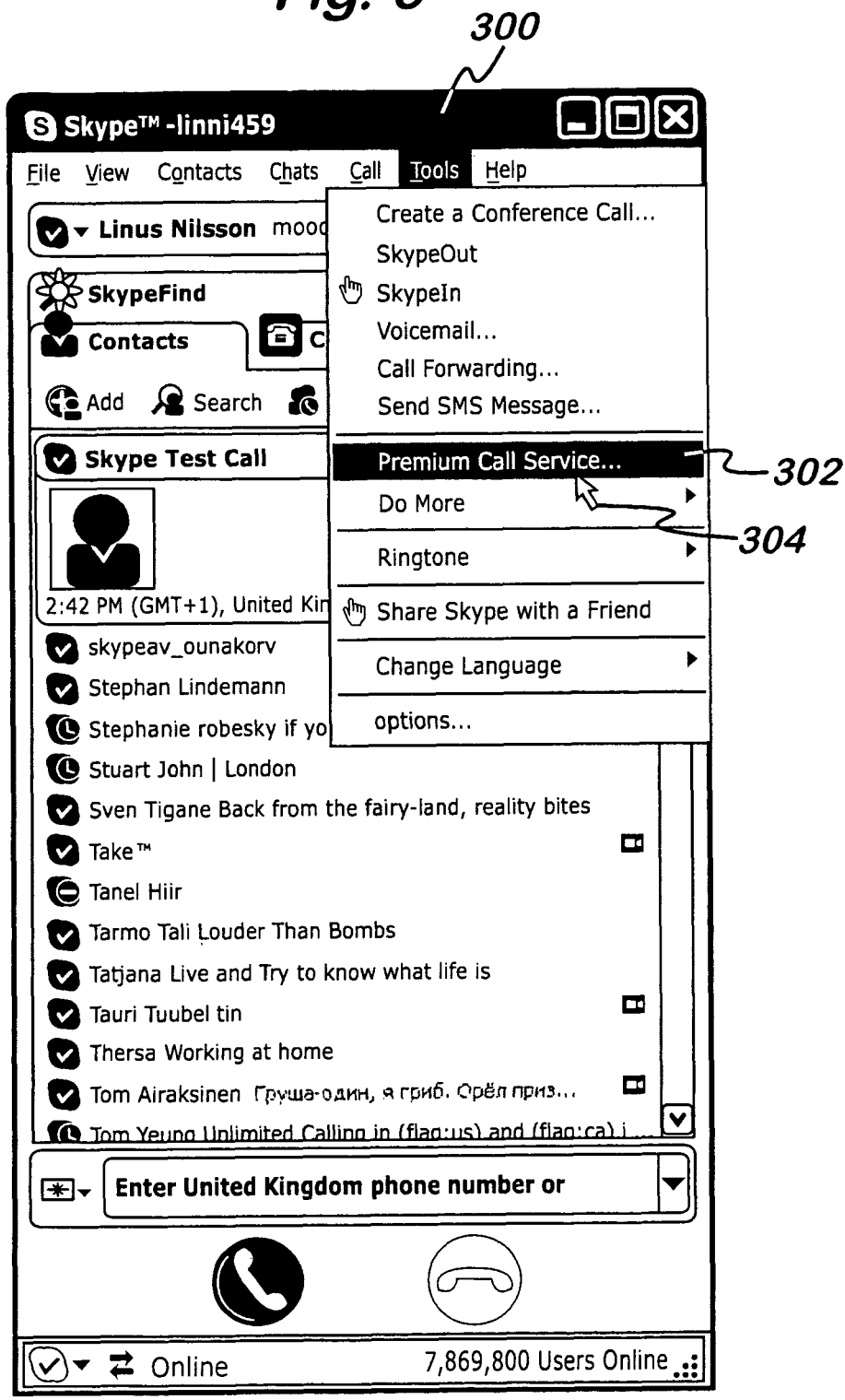
FIGS. 6 to 15 are screen shots showing the displays at a buyer terminal and service provider terminal during implementation of the service provision process.

FIG. 5 is a schematic diagram of fields in a cash token. In addition to the fields mentioned above, each cash token also includes a value field 209 denoting the monetary value of the token.

In order to secure price proposal messages (sent in step S2), the price proposals are RSA signed by a service provider user identification certificate (UIC key). The ssp gateway 14a verifies the UIC key and the signature before sending the contract preparation message 300 to the BES event queue in step S3. The UIC serial number is checked from the user info database 112.

In order to achieve backend security, an RSA key pair is used for Diffie-Hellman key exchange between the service provider and the ssp gateway 14a. The backend server has an RSA key pair, private and public key. The caller and service provider terminals have a hard coded (built in) copy of the public key. The backend server uses the same key pair for all crypto handshakes. The terminals use the same public key for all handshakes. It will be appreciated that other security mechanisms are possible.

The service provision system discussed herein can be suitably implemented on the existing peer-to-peer call communication system which is currently available under the trade mark Skype. In that communication system, software clients which are executed at the client terminals already have available to them a list of user names which can be used in the present service provision system. That is, existing user names can be used to identify both buyers and the service providers. Before signing up to the service provision system, it is advantageous that the user already has a Paypal account but, as mentioned above, other payment mechanisms are possible.

It is an important aspect of the service provision system discussed herein that calls are always initiated by a buyer and cannot be initiated by a service provider. Any existing user of the current communication system available under the trade mark Skype can sign up to become so-called premium service providers.

It will readily be apparent that price proposals can implement a number of different pricing policies. For example, there could be a charge per minute of the call spent on providing the service, a charge per event or a combination of both. As already mentioned, if the currency requested by the service provider in the price proposal differs from the currency in which the buyer account is held, the ssp database at the backend server takes care of converting the request currency to the buyer account currency using prevailing conversion rates.

Figure 7:
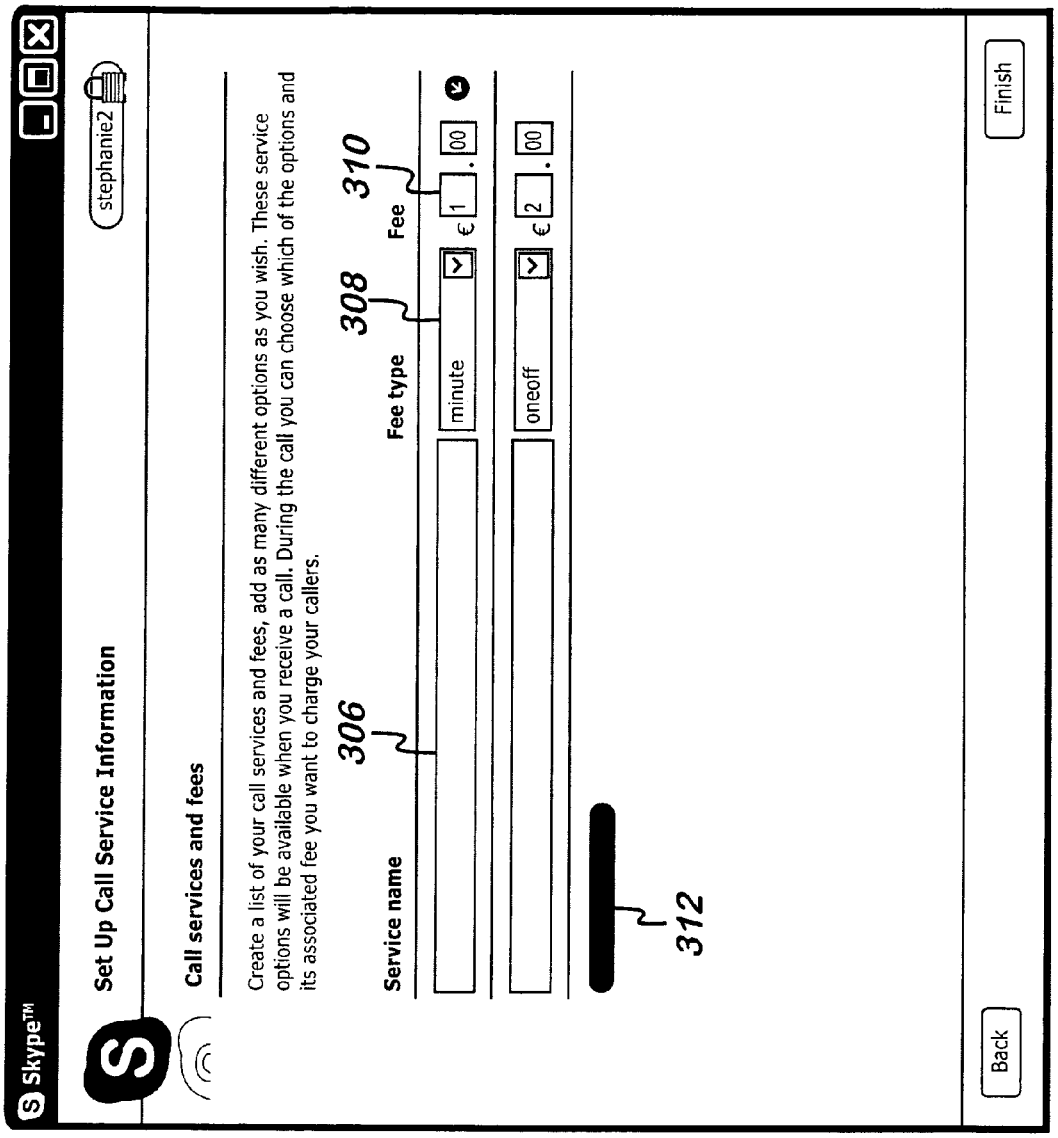

Reference will now be made to FIGS. 6 to 15 to illustrate how the displays launched by the clients in the peer-to-peer communication system for premium call service. The following are screen shots showing the display launched by the software client which also handles the implementing of call instances. According to FIG. 6, under the tools section 300 of a toolbar launched by the client is a drop down menu which includes the option of 302 of "premium call service". When the user activates this field (for example using the cursor 304 and a mouse), a display screen is provided to the customer as shown in FIG. 7 which provides a field 306 for identifying a service, a drop down menu 308 for identifying a charging policy and a field 310 for holding a price dependent on the charging policy, that is per minute or per event or both. An actuatable button 312 allows the addition of more services.

As already mentioned, it is a requirement in one implementation of the system that uses a Paypal payment mechanism that a Paypal account for the service provider is created if it does not already have one. The creation of such a Paypal account is known already and is not discussed in more detail herein. For embodiments where other payment mechanisms are used, this is not required.

Figure 8:
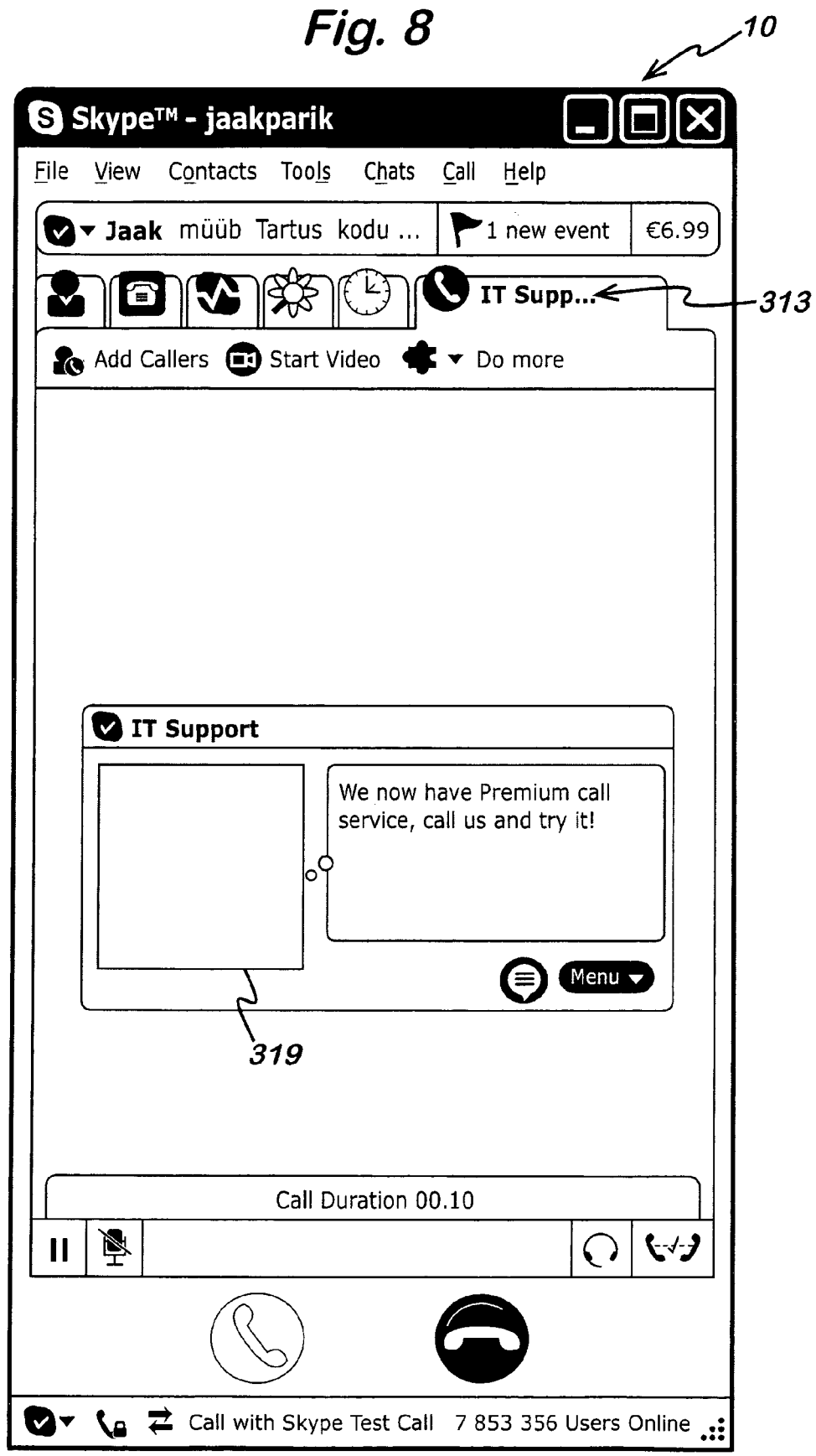
Figure 9:
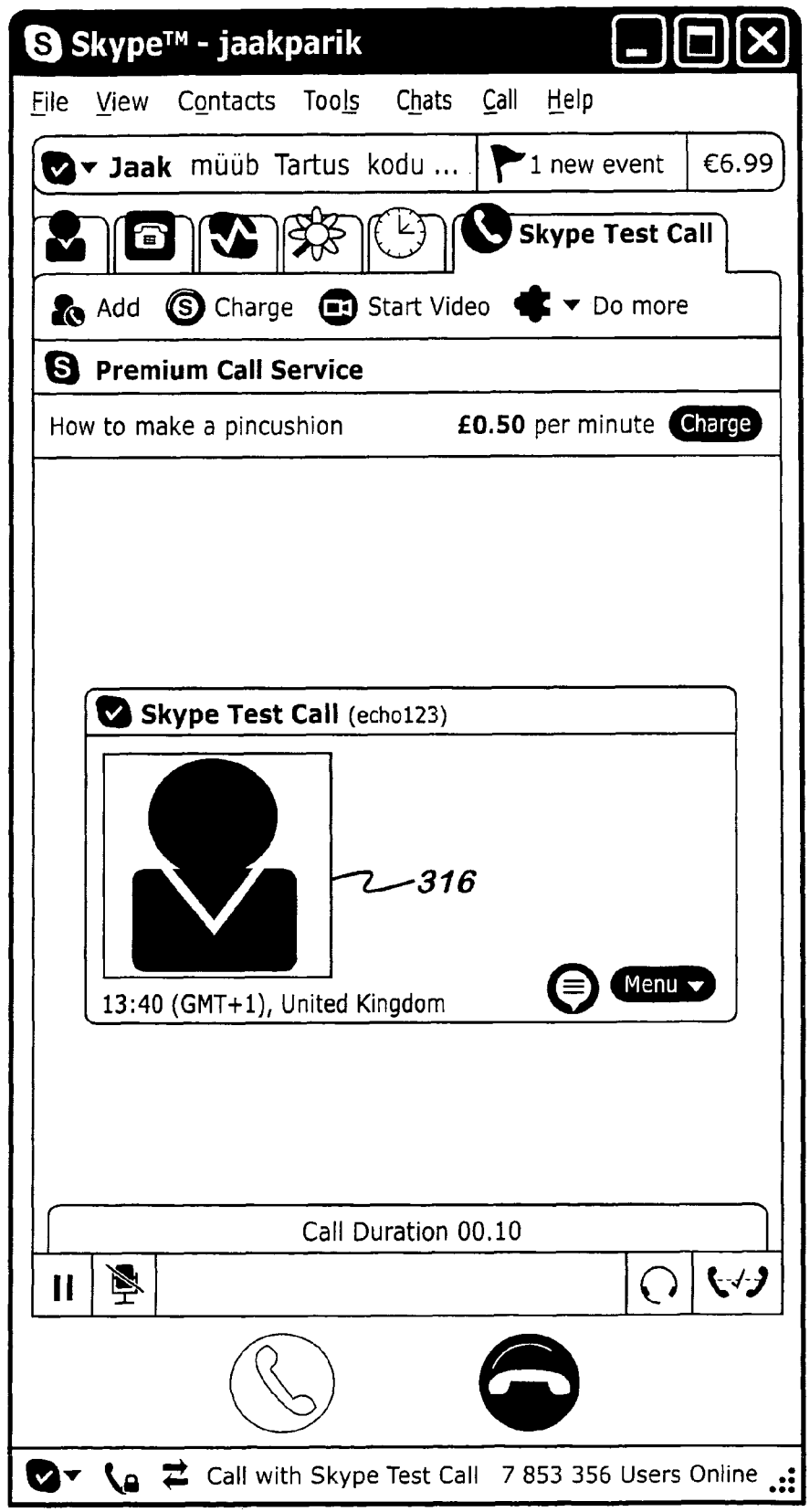
Figure 10:
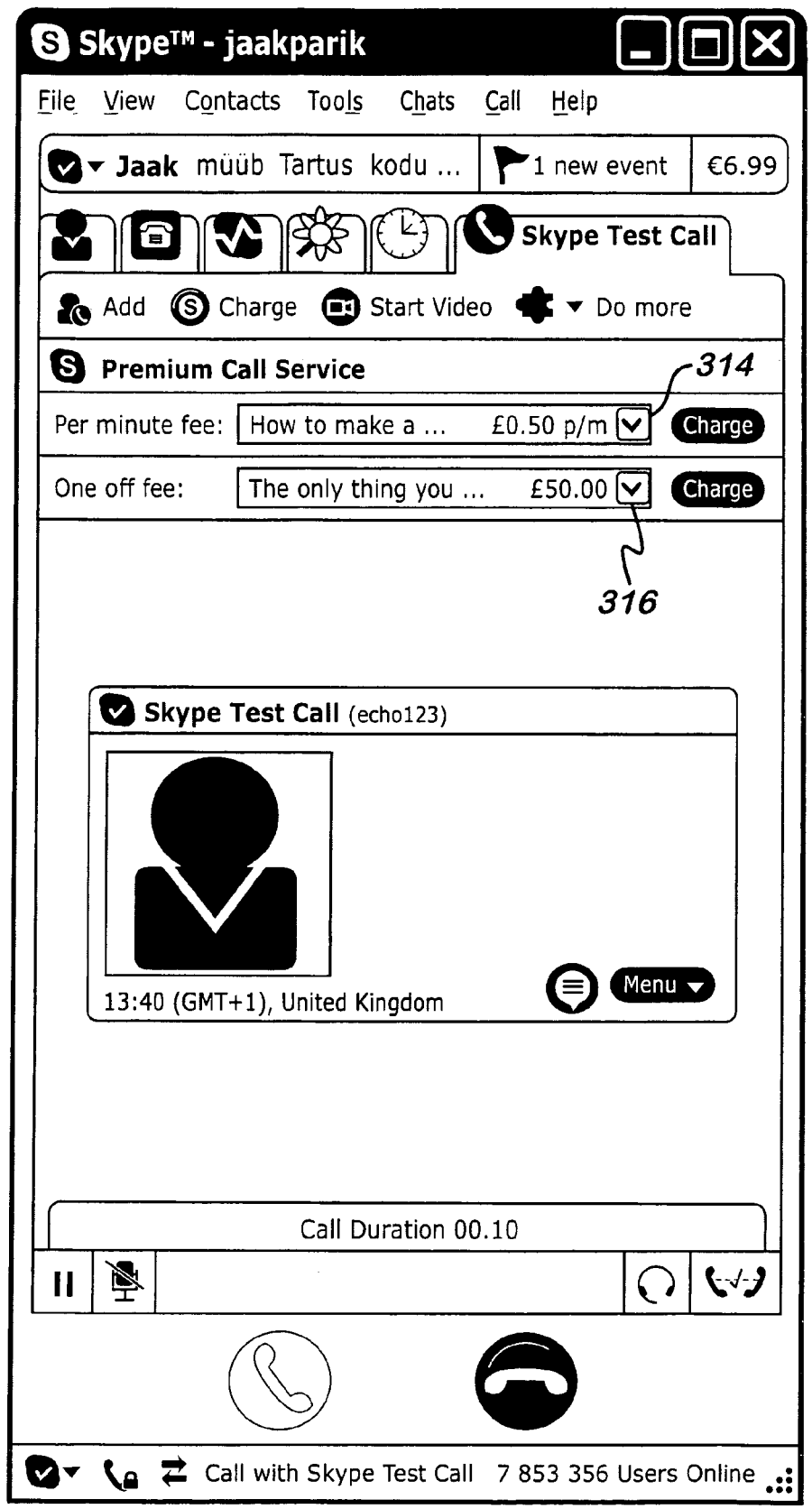
Figure 11:
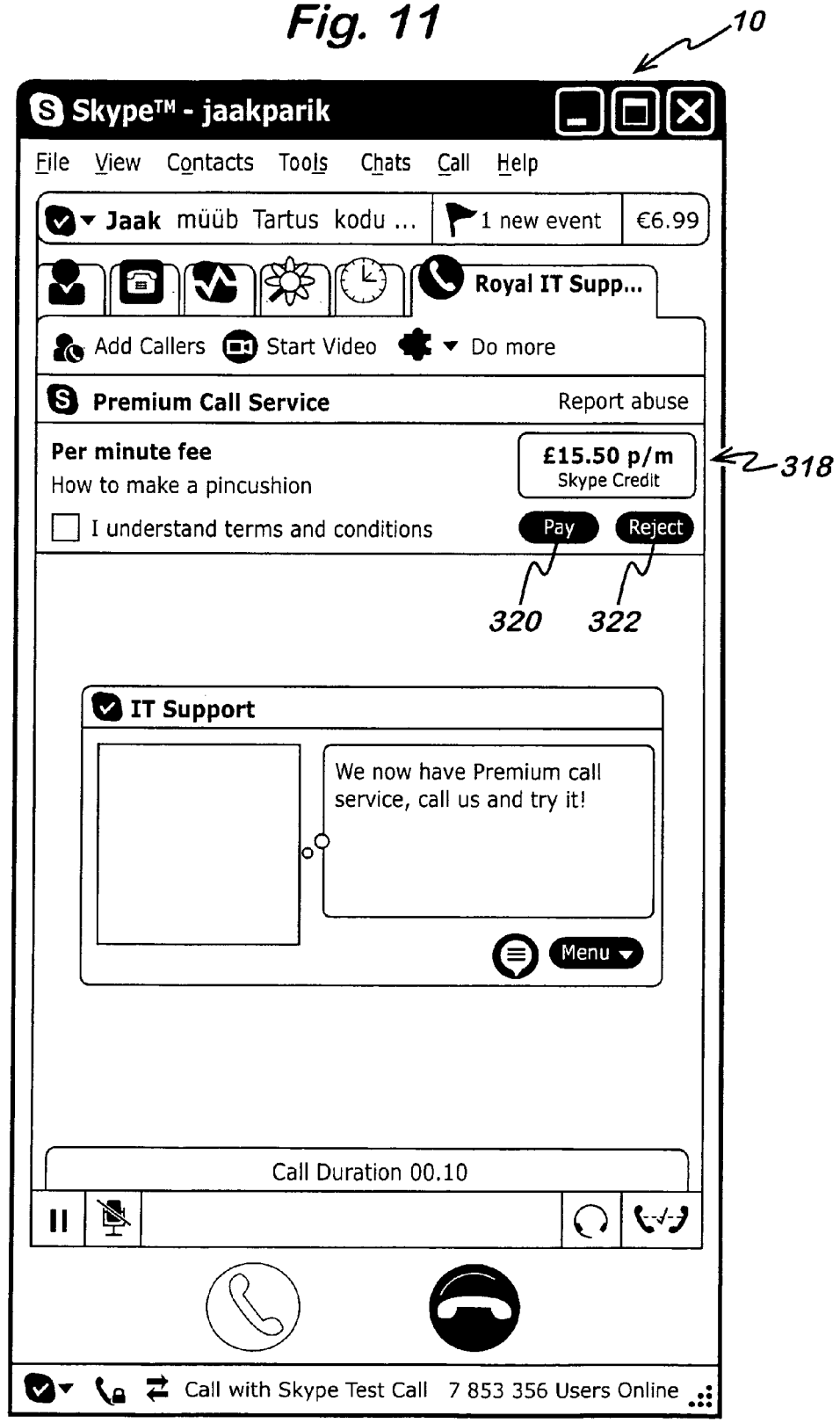
Figure 12:
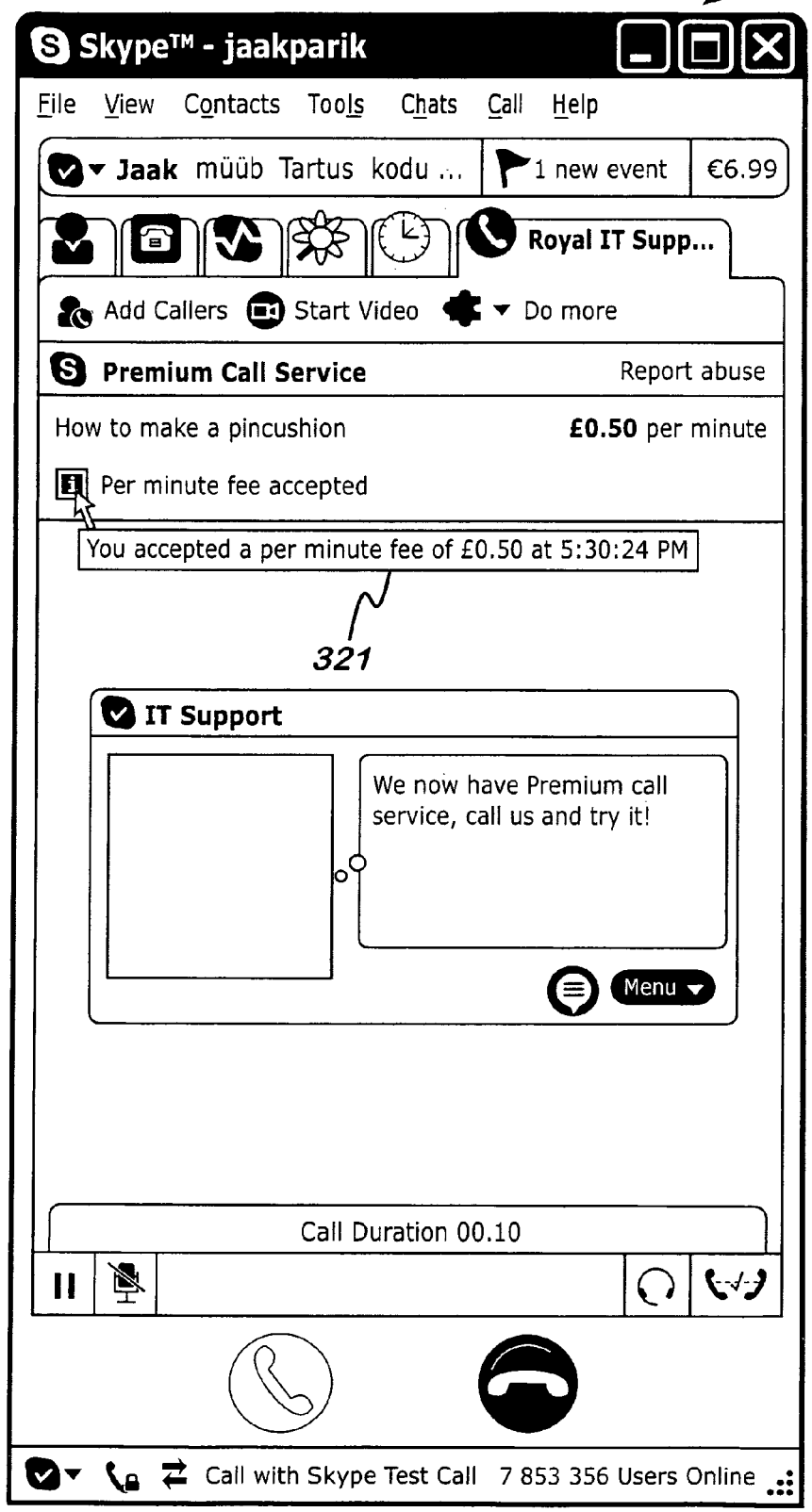
Figure 13:
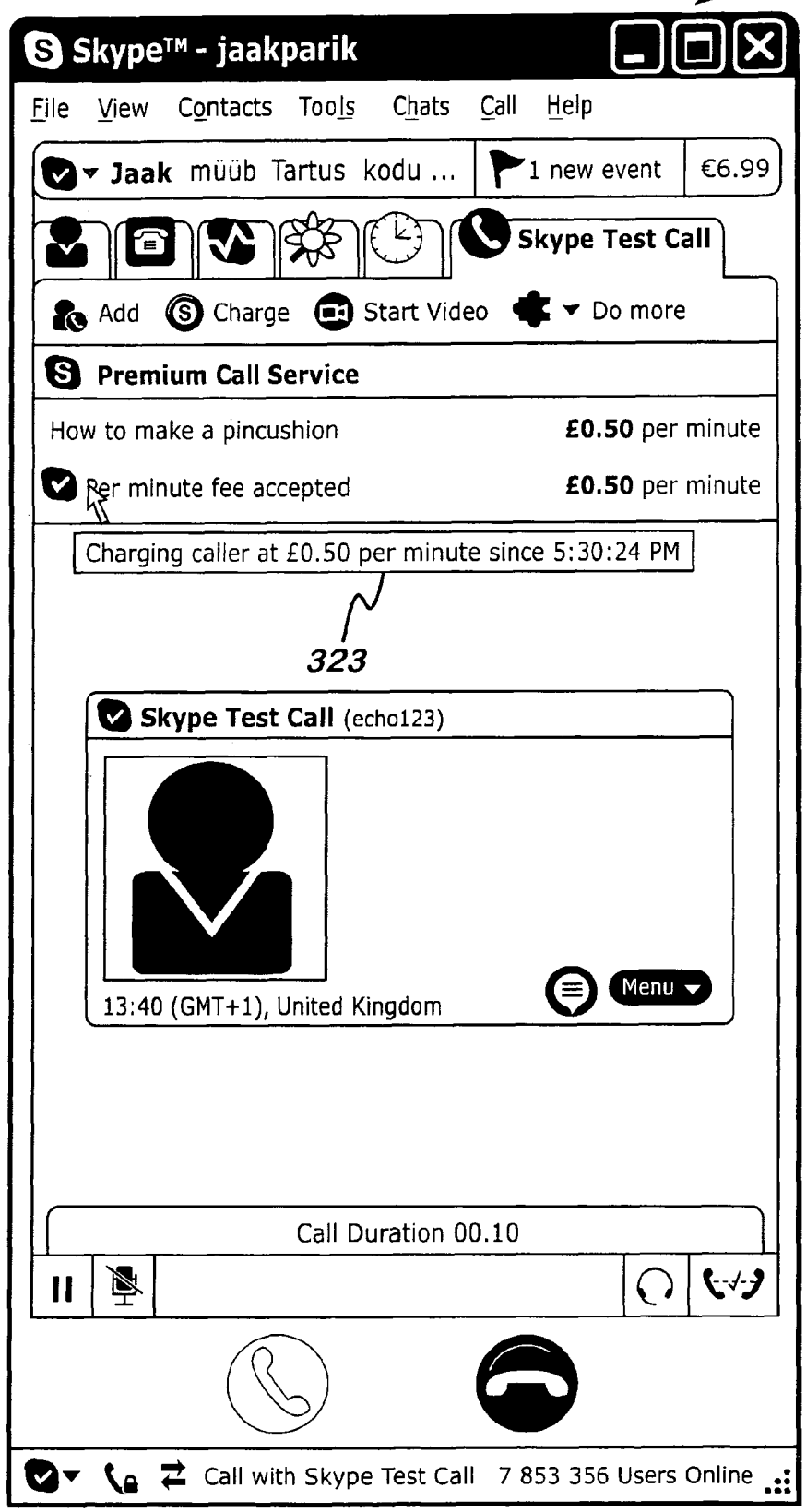
Figure 14:
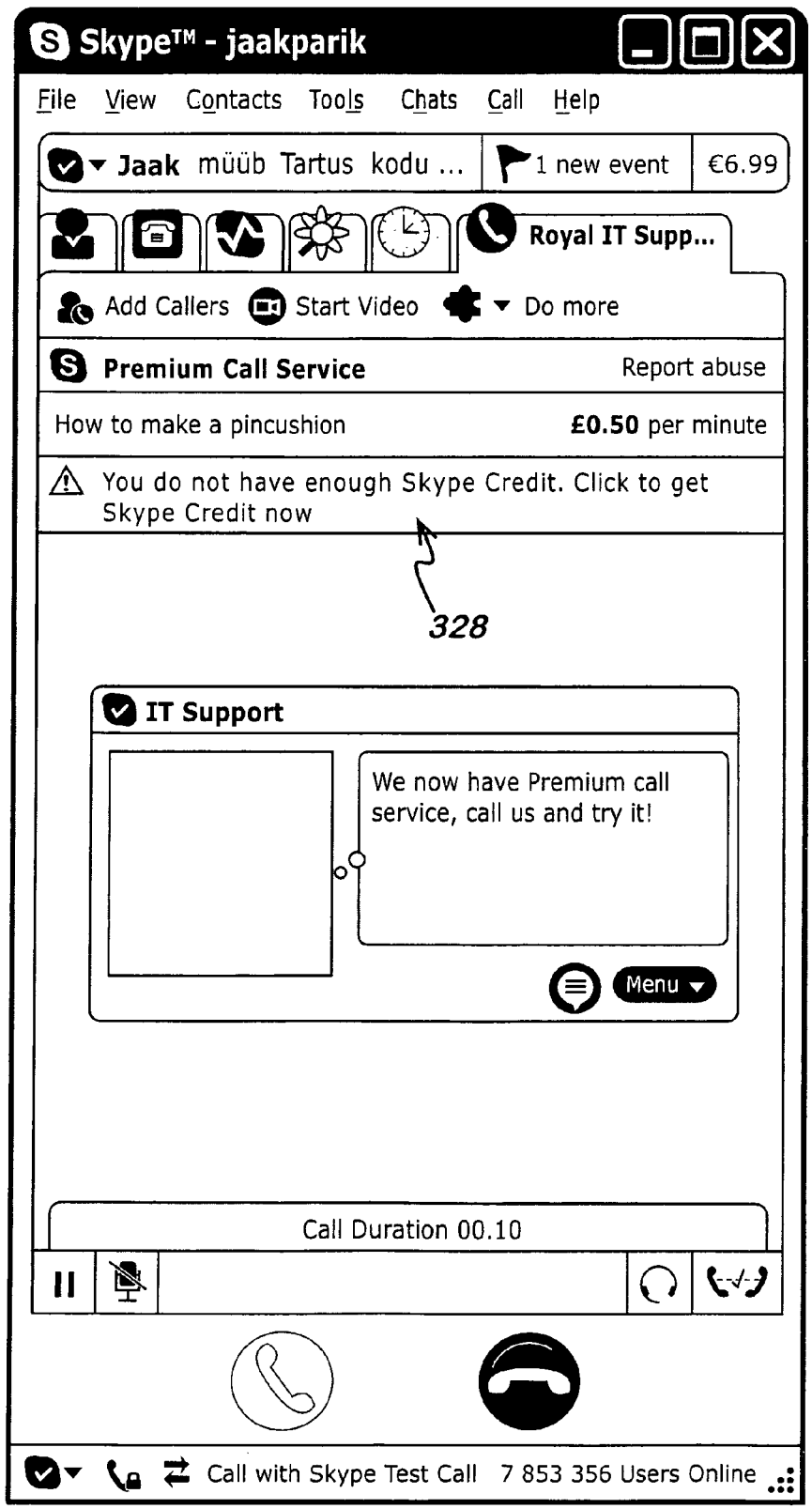

In order to initiate the process, a buyer selects a service provider from a list of service providers which is available to it. This list can be launched through the client software which handles the call instances of previously used service providers, or can be from any other source. As shown in FIG. 8, when the buyer initiates a call to a user 313 in his contact list, the identity and image of the service provider (user) he has called is displayed in an image field 319 to the buyer at its client terminal 10. FIG. 9 illustrates the view launched by the client to the service provider at this point. That is, the service provider knows that a call is being made to it from the screen 317. The service provider answers the call and the dialogue discussed above ensues to agree a price/service proposal. FIG. 10 illustrates the display launched by the client of the service provider in order to allow it to select a service and charge rate. A field 314 holds a per minute charge for a first service (in this example how to make a pin cushion) and a field 316 holds a one-off fee for a second service. The service provider dispatches a price proposal (step S2) to the buyer client terminal 10 and FIG. 11 shows the display that is launched at the buyer client terminal 10 (after the backend server has verified the proposal (S3 to S5)) to accept or reject the price proposal. That is, the display shows the terms of the price proposal at 318 including an accept button 320 labelled "pay" and a reject button 322. Once the buyer has accepted (FIG. 12—(ref. 321)) the terms his display changes to show that the fee has been accepted and the display at the service provider terminal 12 changes also to show that the fee has been accepted as illustrated in FIG. 13, ref. 323.

Figure 15:
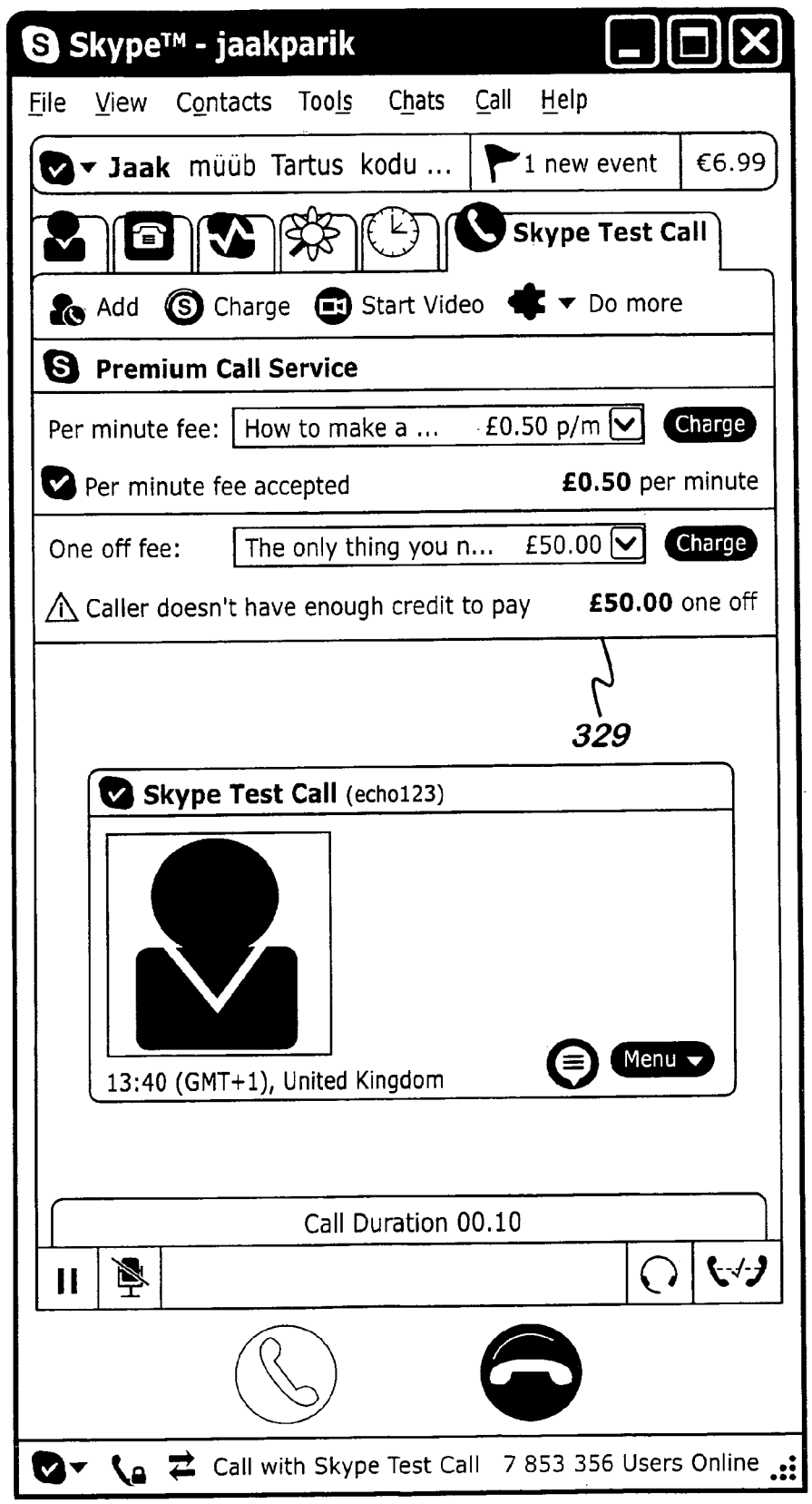

The billing procedure is then initiated (step S7) and assuming that the buyer has sufficient credit to cover the price proposal, cash tokens are received from the backend server and conveyed to the service provider (step S9, SI0). The service provider is notified accordingly and can proceed to provide the service. If the buyer does not have sufficient credit, the client at the buyer client terminal launches the display shown in FIG. 14 indicating that he does not have enough credit (328). The client terminal at the service provider similarly displays to the service provider that the caller does not have enough credit (FIG. 15, ref 329). There is therefore no need for the service provider to continue the call and provide the service unless he wishes to do so unpaid. In this system, the service provider does have this option.

It is noted that although the above described embodiment assumes that a buyer account has prepaid credit, any number of alternatives are possible, for example post-paid, corporate accounts or real-time top up.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing services in a communication system, the method comprising:
    establishing, using a caller terminal, a call instance from the caller terminal to a service provider terminal in the communication system;
    receiving, at the caller terminal and from the service provider terminal, a service proposal in the form of an electronic document via the established call instance;
    selectively accepting or rejecting, at the caller terminal, the service proposal;
    responsive to acceptance of the service proposal, transmitting, from the caller terminal, a request for money to a backend server in the communication system;
    receiving, at the caller terminal, electronic cash tokens from the backend server in response to the request for money, the electronic cash tokens comprising:
        an indication that a caller account has been debited for services identified in the service proposal;
        a caller identifier;
        a service provider identifier; and
        a monetary value; and
    forwarding the electronic cash tokens, from the caller terminal, to the service provider using the service provider identifier, terminal effective to enable the service provider to provide services in accordance with the service proposal.

2. A method according to claim 1, wherein the services are provided via the call instance by one of voice, video, or instant messaging service.

3. A method according to claim 1, wherein the service proposal is in the form of an authenticated electronic document.

4. A method according to claim 1, the method further comprising displaying, at the caller terminal, the service proposal, the displaying including displaying means actuable by the caller for accepting or rejecting the proposal.

5. A method according to claim 1, wherein the service proposal includes charging rates for the service, the charging rates being one of a per time basis or a per event basis.

6. A method according to claim 1, the method further comprising enabling, with the caller terminal, payment to the service provider via a payment mechanism based on the funds accrued as payment for services provided in accordance with the service proposal.

7. A method according to claim 1, which comprises authenticating the service proposal, at least in part, via an authentication code attached to the electronic document.

8. A method according to claim 1, wherein the electronic cash tokens further comprise at least one of a sequence number or a cryptographic signature.

9. A caller terminal arranged to receive services from a service provider terminal, the caller terminal comprising:
    means for establishing a call instance between the caller terminal and the service provider terminal;
    means for receiving a service proposal in the form of an electronic document via the call instance for forwarding the service proposal to a backend terminal;
    means for displaying to a user of the caller terminal the service proposal, said means for displaying configured to enable the user to accept or reject the service proposal;
    means for transmitting a request for money to a backend terminal;
    means for receiving electronic cash tokens from the backend terminal, the electronic cash tokens comprising:
        an indicator indicating that a caller account has been debited for services identified in the service proposal;
        an indicator indicating a caller identifier;
        an indicator indicating a service provider identifier; and
        an indicator indicating a monetary value; and
    means for forwarding the electronic cash tokens to the service provider terminal using the service provider identifier, via the established call instance.

10. The caller terminal as recited in claim 9, the caller terminal further comprising:
    means for receiving, in response to the request for money, an indication from the backend terminal indicating insufficient credit; and
    means for displaying, on the caller terminal, a notification of the insufficient credit.

11. The caller terminal as recited in claim 9, the caller terminal further comprising:
    means for generating a new service proposal contract based, at least in part, on a previously agreed upon service proposal contract; and
    means for transmitting the new service proposal contract to the backend terminal.

12. The caller terminal as recited in claim 9, the caller terminal further comprising:
    means for enabling selection of a service provider associated with the service provider terminal from a list of service providers available to the caller terminal.

13. The caller terminal as recited in claim 11, the means for transmitting the new service proposal contract further configured to act as an end contract message associated with the previously agreed upon service proposal contract.

14. A computing device comprising:
    one or more processors;
    one or more computer readable storage media comprising computer-readable instructions which, responsive to execution by the one or more processors, cause the one or more processors to perform operations comprising:
       establishing a call instance from a first terminal to a service provider terminal;
       receiving from the service provider terminal a service proposal in the form of an electronic document via the established call instance;
       enabling selectively accepting or rejecting the service proposal; responsive to acceptance of the service proposal, transmitting a request for money to a backend server;
       receiving electronic cash tokens from the backend server in response to the request for money, wherein the electronic cash tokens comprise:
          an indication that a caller account has been debited for services identified in the service proposal;
          a caller identifier;
          a service provider identifier;
          a monetary value; and
       forwarding the electronic cash tokens, from the caller terminal, to the service provider terminal using the service provider identifier, effective to enable the service provider to provide services in accordance with the service proposal.

15. The computing device as recited in claim 14, wherein the services are provided via the call instance by one of voice, video, or instant messaging service.

16. The computing device as recited in claim 14, wherein the service proposal is in the form of an authenticated electronic document.

17. The computing device as recited in claim 14, the computer-readable instructions further comprising instructions that cause the one or more processors to display the service proposal with means actuable by the caller for accepting or rejecting the proposal.

18. The computing device as recited in claim 14, wherein the service proposal includes charging rates for the service, the charging rates being on one of a per time basis or a per event basis.

19. The computing device as recited in claim 14, the computer-readable instructions further comprising instructions that cause the one or more processors to enable payment to the service provider via a payment mechanism based on funds accrued as payment for services provided in accordance with the service proposal.

20. The computing device as recited in claim 14, the computer-readable instructions further comprising instructions that cause the one or more processors to authenticate the service proposal, at least in part, via an authentication code attached to the electronic document.

21. The computing device as recited in claim 14, wherein the electronic cash tokens further comprise at least one of a sequence number and a cryptographic signature.

\* \* \* \* \*